US008700735B1

(12) United States Patent
Dale et al.

(10) Patent No.: US 8,700,735 B1
(45) Date of Patent: *Apr. 15, 2014

(54) MULTI-LEVEL CACHE WITH SYNCH

(71) Applicant: Zynga Inc., San Francisco, CA (US)

(72) Inventors: Scott Dale, Los Gatos, CA (US);
Nathan Brown, San Francisco, CA (US); Michael Arieh Luxton, Hillsborough, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/680,176

(22) Filed: Nov. 19, 2012

Related U.S. Application Data

(63) Continuation of application No. 13/077,466, filed on Mar. 31, 2011, now Pat. No. 8,332,488.

(60) Provisional application No. 61/449,551, filed on Mar. 4, 2011.

(51) Int. Cl.
*G06F 15/16* (2006.01)

(52) U.S. Cl.
USPC ........... 709/217; 709/218; 711/117; 711/118; 711/119

(58) Field of Classification Search
USPC ......... 709/217, 218, 219, 213, 214, 215, 216, 709/226, 231, 242; 711/117, 118, 119, 122, 711/137
See application file for complete search history.

(56) References Cited

U.S. PATENT DOCUMENTS

| 6,769,068 | B1 | 7/2004 | Brozowski et al. |
| 7,370,335 | B1 | 5/2008 | White et al. |
| 7,565,494 | B1 * | 7/2009 | Todd et al. ............... 711/137 |
| 7,657,652 | B1 * | 2/2010 | Balaji ...................... 709/242 |
| 7,673,327 | B1 | 3/2010 | Polis et al. |
| 7,769,395 | B2 | 8/2010 | Fiatal et al. |
| 7,801,971 | B1 | 9/2010 | Amidon et al. |
| 7,827,208 | B2 | 11/2010 | Bosworth et al. |
| 7,974,983 | B2 | 7/2011 | Goeldi |
| 8,078,741 | B2 | 12/2011 | Barnfield et al. |
| 8,086,253 | B1 | 12/2011 | Kalamkar et al. |
| 8,171,114 | B1 | 5/2012 | Dale et al. |
| 8,276,190 | B1 | 9/2012 | Chang et al. |

(Continued)

OTHER PUBLICATIONS

"U.S. Appl. No. 13/077,411, Response filed May 1, 2013 to Non Final Office Action mailed Dec. 6, 2012", 16 pgs.

(Continued)

*Primary Examiner* — Le H Luu

(74) *Attorney, Agent, or Firm* — Schwegman Lundberg & Woessner, P.A.

(57) ABSTRACT

Disclosed in some examples is a method of caching by storing data in a first cache specific to a first geographic area and accessible only by a first application in the first geographic area; storing data in a second cache specific to a second geographic area and accessible by a plurality of applications in the second geographic area including the first application and a second application, the second geographic area being larger than and encompassing at least part of the first geographic area; responsive to a miss in the first cache for data, contacting the second cache and searching for the data in the second cache; and responsive to a hit for the data in the second cache, sending the data to a first application, wherein the data was placed in the second cache by a second application.

19 Claims, 5 Drawing Sheets

(56) References Cited

U.S. PATENT DOCUMENTS

| | | | |
|---|---|---|---|
| 8,296,784 B1 | 10/2012 | Brown et al. | |
| 8,311,531 B2 | 11/2012 | Haaparanta et al. | |
| 8,332,488 B1 | 12/2012 | Dale et al. | |
| 8,347,322 B1 | 1/2013 | Brown et al. | |
| 8,352,969 B2 | 1/2013 | Brown et al. | |
| 8,352,970 B2 | 1/2013 | Brown et al. | |
| 8,386,250 B2 | 2/2013 | Lloyd et al. | |
| 8,429,277 B2 | 4/2013 | Dale et al. | |
| 8,522,137 B1 | 8/2013 | Brown et al. | |
| 8,549,073 B2 | 10/2013 | Dale et al. | |
| 2002/0065899 A1* | 5/2002 | Smith et al. | 709/214 |
| 2003/0018670 A1 | 1/2003 | Ashford et al. | |
| 2004/0268231 A1 | 12/2004 | Tunning | |
| 2005/0193332 A1 | 9/2005 | Dodrill et al. | |
| 2005/0216550 A1 | 9/2005 | Paseman et al. | |
| 2006/0143303 A1* | 6/2006 | Serenyi et al. | 709/231 |
| 2006/0265689 A1 | 11/2006 | Kuznetsov et al. | |
| 2007/0150603 A1 | 6/2007 | Crull et al. | |
| 2007/0300258 A1 | 12/2007 | O'Connor et al. | |
| 2008/0182563 A1 | 7/2008 | Wugofski et al. | |
| 2009/0016504 A1 | 1/2009 | Mantell et al. | |
| 2009/0049525 A1 | 2/2009 | D'Angelo et al. | |
| 2009/0187865 A1 | 7/2009 | Brownholtz et al. | |
| 2009/0199275 A1 | 8/2009 | Brock et al. | |
| 2009/0292814 A1 | 11/2009 | Ting et al. | |
| 2009/0307332 A1* | 12/2009 | Litwin | 709/219 |
| 2010/0010866 A1 | 1/2010 | Bal et al. | |
| 2010/0077045 A1 | 3/2010 | Bercu et al. | |
| 2010/0100952 A1 | 4/2010 | Sample et al. | |
| 2010/0114788 A1 | 5/2010 | White et al. | |
| 2010/0144788 A1 | 6/2010 | Stensbol et al. | |
| 2010/0199340 A1 | 8/2010 | Jonas et al. | |
| 2010/0217869 A1* | 8/2010 | Esteban et al. | 709/226 |
| 2010/0223341 A1 | 9/2010 | Manolescu et al. | |
| 2010/0235578 A1* | 9/2010 | Sih et al. | 711/122 |
| 2010/0274815 A1 | 10/2010 | Vanasco | |
| 2010/0281216 A1* | 11/2010 | Patel et al. | 711/118 |
| 2010/0306099 A1 | 12/2010 | Hirson et al. | |
| 2011/0022580 A1 | 1/2011 | Badulescu et al. | |
| 2011/0023101 A1 | 1/2011 | Vernal et al. | |
| 2011/0040844 A1 | 2/2011 | Lawler et al. | |
| 2011/0047182 A1 | 2/2011 | Shepherd et al. | |
| 2011/0055333 A1 | 3/2011 | Guy et al. | |
| 2011/0113073 A1 | 5/2011 | Chang | |
| 2011/0113094 A1 | 5/2011 | Chunilal | |
| 2011/0145270 A1 | 6/2011 | Christopher et al. | |
| 2011/0145512 A1* | 6/2011 | Adl-Tabatabai et al. | 711/141 |
| 2011/0153759 A1 | 6/2011 | Rathod | |
| 2011/0154445 A1 | 6/2011 | Schmidt-Karaca et al. | |
| 2011/0161478 A1 | 6/2011 | Formo et al. | |
| 2011/0162038 A1 | 6/2011 | Chunilal | |
| 2011/0173397 A1* | 7/2011 | Boyle et al. | 711/137 |
| 2011/0179161 A1 | 7/2011 | Guy et al. | |
| 2011/0219190 A1* | 9/2011 | Ng et al. | 711/122 |
| 2011/0231489 A1 | 9/2011 | Rathod | |
| 2011/0238755 A1 | 9/2011 | Khan et al. | |
| 2011/0238766 A1 | 9/2011 | Lew et al. | |
| 2011/0239282 A1 | 9/2011 | Svarfvar et al. | |
| 2011/0251898 A1 | 10/2011 | Scott et al. | |
| 2011/0251970 A1 | 10/2011 | Oien et al. | |
| 2011/0270685 A1 | 11/2011 | Marks et al. | |
| 2012/0054631 A1 | 3/2012 | Nurmi et al. | |
| 2012/0072494 A1 | 3/2012 | Wong et al. | |
| 2012/0158715 A1 | 6/2012 | Maghoul et al. | |
| 2012/0173383 A1 | 7/2012 | Badawiyeh et al. | |
| 2012/0184363 A1 | 7/2012 | Barclay et al. | |
| 2012/0202587 A1 | 8/2012 | Allen et al. | |
| 2012/0214564 A1 | 8/2012 | Barclay et al. | |
| 2012/0215538 A1 | 8/2012 | Cleasby et al. | |
| 2012/0221645 A1 | 8/2012 | Anthru et al. | |
| 2012/0226749 A1 | 9/2012 | Dale et al. | |
| 2012/0227086 A1 | 9/2012 | Dale et al. | |
| 2012/0227087 A1 | 9/2012 | Brown et al. | |
| 2012/0246245 A1 | 9/2012 | Nilsson | |
| 2012/0254902 A1 | 10/2012 | Brown et al. | |
| 2012/0254903 A1 | 10/2012 | Brown et al. | |
| 2012/0254904 A1 | 10/2012 | Brown et al. | |
| 2013/0024949 A1 | 1/2013 | Baldwin et al. | |

OTHER PUBLICATIONS

"U.S. Appl. No. 13/077,440, Non Final Office Action mailed Apr. 29, 2013", 10 pgs.

"U.S. Appl. No. 13/190,281 , Response filed Apr. 9, 2013 to Non Final Office Action mailed Nov. 9, 2012", 20 pgs.

"U.S. Appl. No. 13/190,281, Notice of Allowance mailed May 10, 2013", 10 pgs.

"U.S. Appl. No. 13/244,878, Notice of Allowance mailed Feb. 13, 2013", 5 pgs.

"U.S. Appl. No. 13/244,888 , Response filed Apr. 15, 2013 to Non Final Office Action mailed Nov. 14, 2012", 15 pgs.

"U.S. Appl. No. 13/077,394, Examiner Interview Summary mailed Feb. 8, 2012", 3 pgs.

"U.S. Appl. No. 13/077,394, Non Final Office Action Mailed Dec. 22, 2011", 16 pgs.

"U.S. Appl. No. 13/077,394, Notice of Allowance mailed May 23, 2012", 7 pgs.

"U.S. Appl. No. 13/077,394, Notice of Allowance mailed Sep. 10, 2012", 7 pgs.

"U.S. Appl. No. 13/077,394, Response filed Mar. 22, 2012 to Non Final Office Action mailed Dec. 22, 2011", 15 pgs.

"U.S. Appl. No. 13/077,466, Non Final Office Action mailed Feb. 16, 2012", 6 pgs.

"U.S. Appl. No. 13/077,466, Notice of Allowance mailed Aug. 8, 2012", 11 pgs.

"U.S. Appl. No. 13/077,466, Response filed May 16, 2012 to Office Action mailed Feb. 16, 2012", 10 pgs.

"U.S. Appl. No. 13/077,466, Supplemental Amendment filed May 31, 2012", 10 pgs.

"U.S. Appl. No. 13/190,281, Examiner Interview Summary mailed Aug. 29, 2012", 2 pgs.

"U.S. Appl. No. 13/190,281, Non Final Office Action mailed Nov. 9, 2012", 34 pgs.

"U.S. Appl. No. 13/244,878, Non Final Office Action mailed Jan. 30, 2012", 8 pgs.

"U.S. Appl. No. 13/244,878, Notice of Allowance mailed May 11, 2012", 5 pgs.

"U.S. Appl. No. 13/244,878, Notice of Allowance mailed Jul. 17, 2012", 5 pgs.

"U.S. Appl. No. 13/244,878, Preliminary Amendment filed Dec. 16, 2011", 3 pgs.

"U.S. Appl. No. 13/244,878, Response filed Apr. 30, 2012 to Non Final Office mailed Jan. 30, 2012", 10 pgs.

"U.S. Appl. No. 13/244,885, Examiner Interview Summary mailed Feb. 24, 2012", 1 pg.

"U.S. Appl. No. 13/244,885, Notice of Allowance mailed Feb. 24, 2012", 13 pgs.

"U.S. Appl. No. 13/244,885, Preliminary Amendment filed Dec. 12, 2011", 3 pgs.

"U.S. Appl. No. 13/244,888, Examiner Interview Summary mailed Apr. 9, 2012", 4 pgs.

"U.S. Appl. No. 13/244,888, Final Office Action mailed Jul. 6, 2012", 10 pgs.

"U.S. Appl. No. 13/244,888, Non Final Office Action mailed Dec. 29, 2012", 9 pgs.

"U.S. Appl. No. 13/244,888, Non Final Office Action mailed Nov. 14, 2012", 10 pgs.

"U.S. Appl. No. 13/244,888, Preliminary Amendment filed Dec. 12, 2011", 3 pgs.

"U.S. Appl. No. 13/244,888, Response filed Apr. 30, 2012 to Non Final Office Action mailed Feb. 29, 2012", 11 pgs.

"U.S. Appl. No. 13/244,888, Response filed Oct. 8, 2012 to Final Office Action mailed Jul. 6, 2012", 11 pgs.

"U.S. Appl. No. 13/244,894, Examiner Interview Summary mailed Mar. 5, 2012", 3 pgs.

"U.S. Appl. No. 13/244,894, Final Office Action mailed Jul. 6, 2012", 20 pgs.

(56) References Cited

OTHER PUBLICATIONS

"U.S. Appl. No. 13/244,894, Non Final Office Action mailed Dec. 9, 2011", 16 pgs.
"U.S. Appl. No. 13/244,894, Response filed Feb. 16, 2012 to Non Final Office Action mailed Dec. 9, 2011", 13 pgs.
"U.S. Appl. No. 13/244,894, Response filed Oct. 9, 2012 to Final Office Action mailed Jul. 6, 2012", 11 pgs.
"U.S. Appl. No. 13/244,938, Examiner Interview Summary mailed Feb. 7, 2012", 3 pgs.
"U.S. Appl. No. 13/244,938, Final Office Action mailed May 21, 2012", 17 pgs.
"U.S. Appl. No. 13/244,938, Non Final Office Action mailed Dec. 22, 2011", 18 pgs.
"U.S. Appl. No. 13/244,938, Notice of Allowance mailed Oct. 16, 2012", 7 pgs.
"U.S. Appl. No. 13/244,938, Response filed Mar. 22, 2012 to Non Final Office Action mailed Dec. 22, 2011", 15 pgs.
"U.S. Appl. No. 13/244,938, Response filed Aug. 21, 2012 to Final Office Action mailed May 21, 2012", 11 pgs.
"U.S. Appl. No. 13/244,941, Examiner Interview Summary mailed Feb. 8, 2012", 3 pgs.
"U.S. Appl. No. 13/244,941, Final Office Action mailed May 21, 2012", 12 pgs.
"U.S. Appl. No. 13/244,941, Non Final Office Action mailed Dec. 21, 2011", 15 pgs.
"U.S. Appl. No. 13/244,941, Notice of Allowance mailed Oct. 16, 2012", 7 pgs.
"U.S. Appl. No. 13/244,941, Response filed Mar. 21, 2012 to Non Final Office Action mailed Dec. 21, 2011", 12 pgs.
"U.S. Appl. No. 13/244,941, Response filed Aug. 21, 2012 to Final Office Action mailed May 21, 2012", 8 pgs.
"U.S. Appl. No. 13/244,942, Corrected Notice of Allowance mailed Aug. 24, 2012", 4 pgs.
"U.S. Appl. No. 13/244,942, Examiner Interview Summary mailed Feb. 7, 2012", 3 pgs.
"U.S. Appl. No. 13/244,942, Non Final Office Action mailed Dec. 22, 2011", 18 pgs.
"U.S. Appl. No. 13/244,942, Notice of Allowance mailed Jun. 4, 2012", 11 pgs.
"U.S. Appl. No. 13/244,942, Response filed Mar. 22, 2012 to Non Final Office Action mailed Dec. 22, 2011", 14 pgs.
"Facebook Markup Language (FBML)", [Online]. Retrieved from the Internet: <URL: developers.facebook.com/docs/reference/fbml/>, (Accessed Aug. 17, 2012).
"OpenSocial: Frequently Asked Questions", Google.com, 2011 [retrieved on Dec. 9, 2011]. Retrieved from <http://code.google.com/apis/opensocial/faq.html>, (Accessed Dec. 9, 2011), 2 pgs.
"Social network aggregation", Wikipedia.org, Nov. 11, 2011 [retrieved on Dec. 6, 2011]. Retrieved from <http://en.wikipedia.org/wiki/Social_network_aggregation>, (Accessed Dec. 6, 2011), 3 pgs.
"Socialstream", [Online]. Carnegie Mellon University HCII, 2006. [retrieved on Dec. 6, 2011]. Retrieved from < http://www.hcii.cmu.edu/M-HCI/2006/SocialstreamProject/socialstream.php>, (Accessed Dec. 16, 2011]), 2 pgs.
"SocialStream", Carnegie Mellon University HCII, [Online Video].. Retrieved from the Internet: <URL: http://www.hcii.cmu.edu/M-HCI/2006/SocialstreamProject/Socialstream_demo.mov >, (2006. Accessed Apr. 30, 2012), 5 minutes, 6 seconds; 29.0 MB.
"Socialstream Features", [Online]. Carnegie Mellon University HCII, 2006. [retrieved on Dec. 6, 2011]. Retrieved from Internet: < http://www.hcii.cmu.edu/M-HCI/2006/SocialstreamProject/features.php>, (Accessed Dec. 6, 2011), 3 pgs.

"Storage Media", Microsoft Computer Dictionary, Fifth Edition, Microsoft Press, (2002), p. 499.
"The OAuth 1.0 Protocol", E. Hammer-Lahav (ed.), Internet Engineering Task Force (IETF), Request for Comments: 5849, Category: Informational, ISSN: 2070-1721, (Apr. 2010), 38 pgs.
"The OAuth 2.0 Authorization Protocol", E. Hammer-Lahav et al. (eds.), draft-ietf-oauth-v2-13, Network Working Group, Obsoletes: 5849 (if approved), Intended status: Standards Track, (Feb. 16, 2011), 44 pgs.
"Vinehub Login", Vinehub, 2011, [Online]. Retrieved from the Internet: <URL: http://www.vinehub.com/index.php/login/>, (Accessed Aug. 22, 2012), 1 pg.
"Vinehub: Frequently Asked Questions", Vinehub, 2011, [Online]. Retrieved from the Internet: <UrL: http://www.vinehub.com/index.php/pages/faq/>, (Accessed on Aug. 22, 2012), 1 pg.
"Web Application Toolkit for Social Network APIs", Microsoft, Jul. 15, 2010 [retrieved on Dec. 9, 2011]. Retrieved from <URL: http://archive.msdn.microsoft.com/watsocial, (Accessed Dec. 9, 2011), 2 pgs.
Brown, Nathan, "Social Network Application Programming Interface", U.S. Appl. No. 13/077,394, Application, filed Mar. 31, 2011, 51 pgs.
Brown, Nathan, "Social Network Application Programming Interface", U.S. Appl. No. 13/244,941, Application filed Sep. 26, 2011, 58 pgs.
Brown, Nathan, et al., "Social Network Application Programming Interface", U.S. Appl. No. 13/244,942, Application filed Sep. 26, 2011, 59 pgs.
Morin, Dave, "Announcing Facebook Connect", [online]. Facebook, May 9, 2008 [retrieved on Feb. 14, 2012]. Retrieved from < developers.facebook.com/blog/post/108/ >, (May 9, 2008), 2 pgs.
Mulligan, Catherine, "Open API Standardisation for the NGN Platform", Proceedings of the First ITU-T Kaleidoscope Academic Conference, (2008), 8 pgs.
Perez, Sarah, "Vinehub: New Social Network Connector to Aggregate, Update Multiple Services", ReadWriteWeb, May 20, 2010 [retrieved on Dec. 6, 2011]. Retrieved from <http://www.readwriteweb.com/archives/vinehub_new_social_network_connector_to_aggregate_update_multiple_services.php#.TuJLoUXQb3o.email>, (May 20, 2010), 3 pgs.
Schroeder, S., "20 Ways to Aggregate Your Social Networking Profiles", mashable.com, [Online]. Retrieved from the Internet: <URL: http://mashable.com/2007/07/17/social-network-aggregators/>, (Jul. 17, 2007), 8 pgs.
"U.S. Appl. No. 13/077,411, Non Final Office Action mailed Dec. 6, 2012", 20 pgs.
"U.S. Appl. No. 13/077,411, Final Office Action mailed Aug. 27, 2013", 20 pgs.
"U.S. Appl. No. 13/077,425, Non Final Office Action mailed Oct. 9, 2013", 15 pgs.
"U.S. Appl. No. 13/077,440, Examiner Interview Summary mailed Oct. 28, 2013", 3 pgs.
"U.S. Appl. No. 13/077,440, Final Office Action mailed Oct. 15, 2013", 5 pgs.
"U.S. Appl. No. 13/077,440, Notice of Allowance mailed Nov. 26, 2013", 7 pgs.
"U.S. Appl. No. 13/077,440, Response filed Sep. 30, 2013 to Non Final Office Action mailed Apr. 29, 2013", 9 pgs.
"U.S. Appl. No. 13/077,440, Response filed Nov. 8, 2013 to Final Office Action mailed Oct. 15, 2013", 8 pgs.
"U.S. Appl. No. 13/244,888, Notice of Allowance mailed Jul. 19, 2013", 15 pgs.

* cited by examiner

MULTI-LEVEL CACHE WITH SYNCH

CLAIM OF PRIORITY

This application is a continuation of and claims the benefit of priority under 35 U.S.C. §120 to U.S. patent application Ser. No. 13/077,466, entitled "MULTI-LEVEL CACHE WITH SYNCH," filed on Mar. 31, 2011, which issued as U.S. Pat. No. 8,332,488 on Dec. 11, 2012, which claims the benefit of priority, under 35 U.S.C. Section 119(e), to U.S. Provisional Patent Application Ser. No. 61/449,551, entitled "MULTI-LEVEL CACHE WITH SYNCH," filed on Mar. 4, 2011, the benefit of priority of each of which is claimed hereby, and each of which are incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Zynga, Inc., 2011, All Rights Reserved.

BACKGROUND

A social networking service is an online service, platform or site that allows members to build or reflect social networks or social relations among members. Typically, members construct profiles, which may include personal information such as name, contact information, employment information, photographs, personal messages, status information, links to web related content, blogs, and so on. Typically, only a portion of a member's profile may be viewed by the general public and/or other members.

The social networking site allows members to identify and establish links or connections with other members in order to build or reflect social networks or social relations among members. For instance, in the context of a business networking service, a person may establish a link or connection with his or her business contacts, including work colleagues, clients, customers, and so on. With a social networking service, a person may establish links or connections with his or her friends and family. A connection is generally formed using an invitation process in which one member "invites" a second member to form a link. The second member then has the option of accepting or declining the invitation. If the second member accepts the invitation, the first and second members are connected.

In general, a connection or link may represent or may be otherwise associated with an information access privilege, such that a first person who has established a connection with a second person is, via the establishment of that connection, authorizing the second person to view or access non-publicly available portions of their profiles. Of course, depending on the particular implementation of the business/social networking service the nature and type of the information that may be shared as well as the granularity with which the access privileges may be defined to protect certain types of data may vary greatly.

A variety of different social networking services have gained popularity, including FACEBOOK® of Palo Alto, Calif., MYSPACE® of Beverly Hills, CA and run by News Corp., LINKEDIN® of Mountain View, Calif., TWITTER® of San Francisco, Calif., and the like. These sites often allow for third party applications to utilize certain functionality provided by the host social networking service. In some examples, these third party applications may utilize certain user interface (UI) elements of the social networking service, access personal information about a user including profile information, and send and receive social interactions, such as messages, to the user of the third party application or to their connections. FACEBOOK®, for example allows developers to create applications which are integrated into the FACEBOOK® user interface and with the FACEBOOK® social networking system. In some examples, these applications may include games such as CITYVILLE®, FARMVILLE®, and MAFIA WARS®, all developed by ZYNGA®, Inc. of San Francisco, Calif. These applications appear in a FACEBOOK® page, and make use of various features of FACEBOOK®, such as contacting friends to encourage them to join the game and play with the user and the like.

The social networking services integrate with these applications by providing to these applications an Application Programming Interface or "API." In general, an Application Programming Interface (API) is a particular set of rules and specifications that a software program may follow to access and make use of the services and resources provided by another particular software program that implements that API. The API serves as an interface between different software programs and facilitates their interaction.

Figure 1:
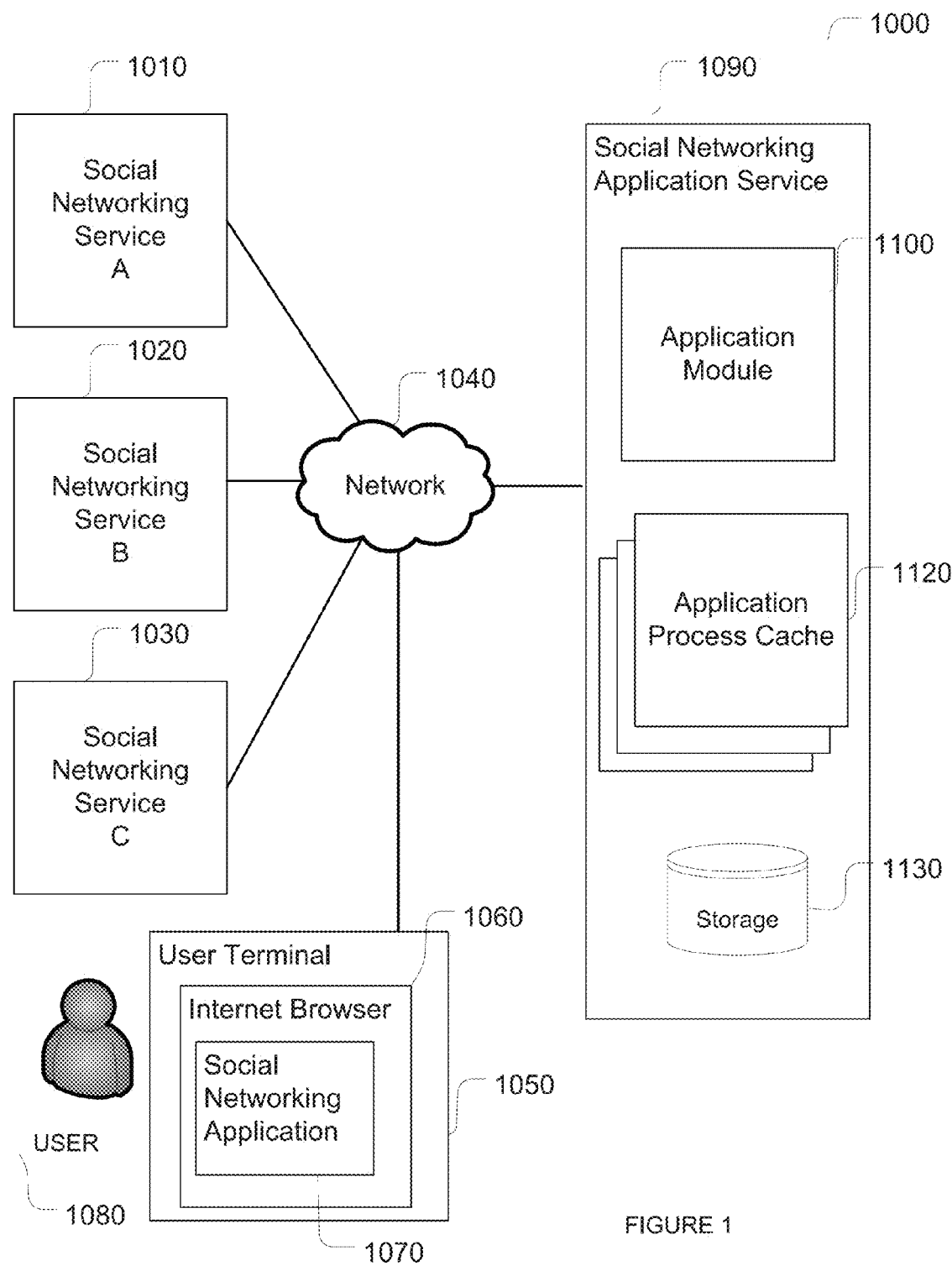
FIG. 1 shows a schematic of a social networking application system according to one example of the present disclosure.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 shows one example system 1000 for providing and supporting a social networking application. Typically, a user, such as user 1080, will access and communicate with one or more social networking services 1010-1030 through network 1040. Social networking services 1010-1030 in some examples may include FACEBOOK®, MYSPACE®, LINKEDIN®, TWITTER®, and the like. In some examples, this communication may be done through the user terminal 1050. User terminal 1050 in some examples may include a personal computer, laptop computer, tablet computer, smart phone or other cellular telephone, electronic book reader, or any other device that allows a user to access the functionality of the social networking service. In some examples, an internet browser 1060 of the user terminal 1050 is used to access the social networking services 1010-1030 using network 1040. Internet browser 1060 in some examples may include Internet Explorer® from Microsoft Corp., Redmond, Wash. Network 1040 may be any method by which user terminal 1050 may communicate with one or more social networking services 1010-1030. In some examples, network 1040 may include the internet, a WAN, LAN, cellular network, or any other method of allowing the user terminal 1050 to connect with the social networking service, and the like. While three social networking services are shown in FIG. 1 (1010-1030), it will be appreciated by those skilled in the art that the system and methods of the current disclosure are applicable to more or less than three social networks.

Typically, when a user 1080 accesses a social networking application (such as a game) the user 1080 selects the application via the social networking service 1010-1030, which then re-directs the user to access the application on another server. In some examples, this server may be located on a social networking application service 1090. The user's browser connects to the application server, downloads the application client, then displays or executes the application. A social networking application 1070 is any application which utilizes, or is capable of utilizing, the API of one or more social networking services. In some examples, this social networking application 1070 may be or include HTML, XML, JavaScript, Adobe Flash, Microsoft Silverlight, and the like. The social network 1010-1030 from which the user selected the content may be called the host social network. The user's browser then executes or displays this social networking application 1070 until the user 1080 decides to exit or the application closes or otherwise ends.

In some examples, while the application 1070 executes, it communicates with the host social networking service to which it is associated. Example communications include authenticating, authorizing, utilizing the user interface elements of the host social network, obtaining social network information about user 1080 such as connections with other users, sending messages to other users, and the like.

In some examples, social networking application 1070 may communicate with social networking application service 1090. Social networking application service 1090 may include various functions to assist social networking application 1070. In some examples, social networking application service 1090 may include application module 1100 which stores and delivers to user terminals (including user terminal 1050) social networking application 1070 from storage 1130. In other examples, application module 1100 may contain execution logic for social networking application 1070. Examples of this execution logic include responding to user actions and inputs; payment and purchasing information for purchasing the application or unlocking, accelerating, or making available various features in the application 1070; sending messages to and from various other users of the application; storing application data in data store 1130; providing various media files such as graphics, video, and sound files; and the like.

While FIG. 1 shows one social networking application 1070, many different instances and different types of social networking applications may utilize social networking application service 1090. These applications often request the same information from the various social networking services. For example, each application that user 1080 executes will likely query social networking services 1010-1030 for a connections list. Each call to the social networking service is slow and in some cases may slow down the execution of the social networking application 1070.

Disclosed in one example is a multi-level caching and synchronization system. This system utilizes different caching layers to cache information retrieved by or for social networking applications from social networking services 1010-1030 for easier retrieval. In some examples, the system is also designed to allow social networking applications to share retrieved data to allow for increased efficiencies. In other examples, the system and method may take geography into account such that various pieces of the caching system are close to the social networking applications for faster response times.

A cache may be short-term storage that can be used to speed up data accesses by temporarily placing data, or a copy of it, in a location where it may be accessed more rapidly than normal. If requested data is contained in the cache (cache hit), this request may be served by simply reading the cache, which is comparatively faster. Otherwise (cache miss), the data might need to be recomputed or fetched from its original, or some other storage location, which may be comparatively slower. In some examples, a cache may be hardware implemented, or software implemented on general purpose hardware. In some examples, the storage for the caches may be implemented in random access memory, but in other examples it may be implemented on persistent storage such as hard disks, magnetic disks, optical disks, tape drives, and the like.

Figure 2:
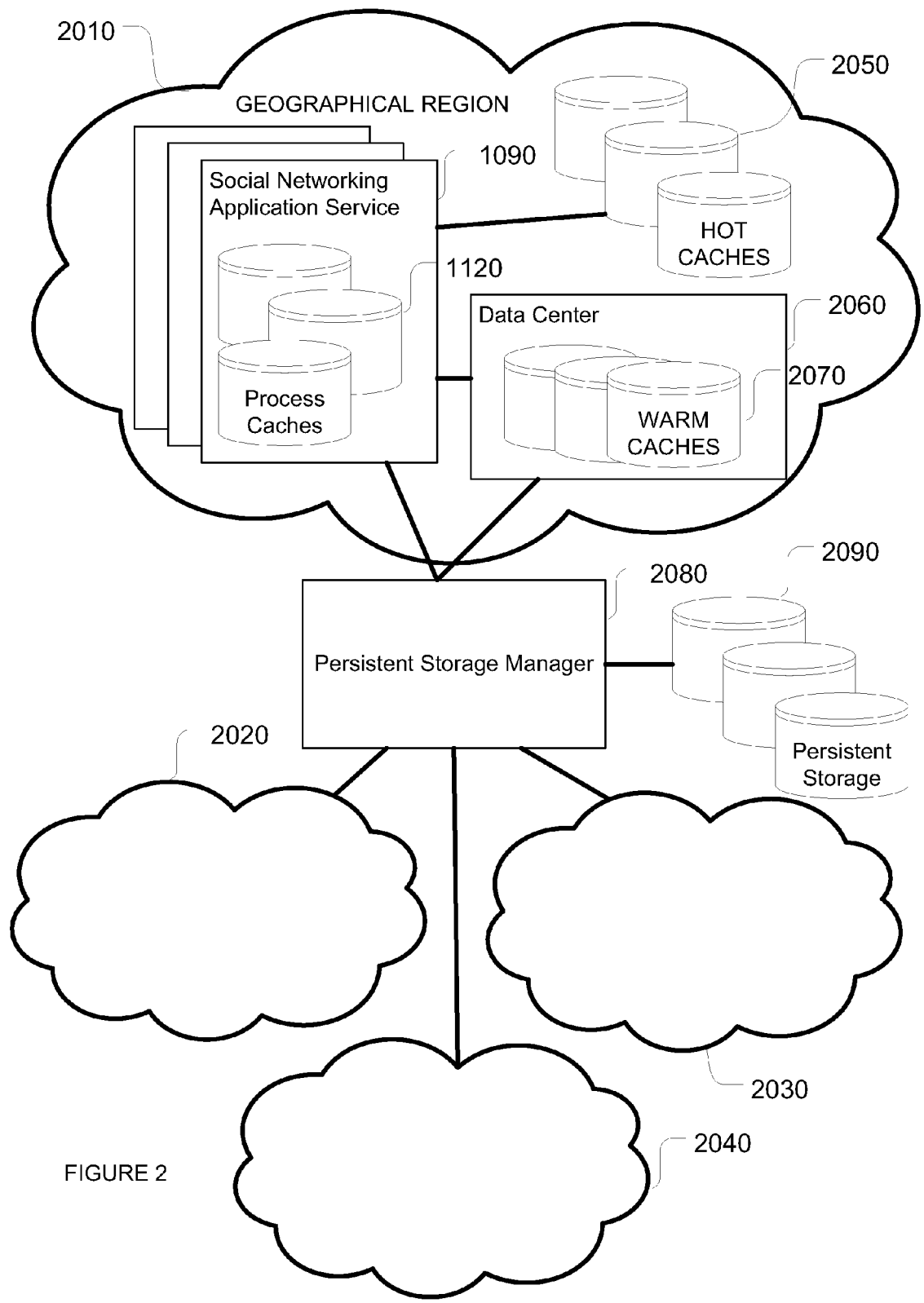
FIG. 2 shows a schematic of a multi-level caching system with split geographies according to one example of the present disclosure.

Turning now to FIG. 2, an example split-geography multi-layer caching system is shown. Elements 2010-2040 represent different defined geographical regions. An exploded view of a region 2010 is shown. Regions 2020-2040 in some examples have the same components as those shown in region 2010. These regions may contain one or more social networking application services 1090. Each social networking application service may contain one or more process cache modules 1120 for the various social networking applications 1070. A request for data from social networking application 1070 may be sent to social networking application service 1090. Social networking application service 1090 may then check application process cache 1120 to determine whether or not the information is already stored in the application process cache 1120. If the information is in the cache (e.g., the cache "hits"), it is returned. If the information is not in the cache (e.g., the cache "misses"), in some examples, the social networking application service may then contact the social networking services 1010-1030 for the information. The process cache may be controlled by the social networking application 1070 or on its behalf by social networking application service 1090, and in some examples, may be specific to a social networking application 1070 such that data placed in the process cache by one social networking application is not accessible by any other social networking application. In some examples, the hardware that implements the social networking process cache may be shared among multiple social networking applications, but logically kept specific to each individual application by software. In other examples, the hardware that implements the social networking process cache may be separate for each application. In yet other examples, the process caches may be located separately from social networking application service 1090.

In other examples, the social networking application service 1090 may utilize additional caching structures and network infrastructure to handle the request on a miss from the process cache. Social networking application services 1090 located within geographical region or area 2010 may have access to hot caches 2050. Hot caches 2050 may be specific to each social networking application 1070 and may be checked if the process cache misses (does not have the required data).

The hot caches may be implemented on one or more computing resources including servers, persistent storage, databases, etc. . . . that are generally located close to the social networking application service 1090 that they serve and configured to provide a cache. As with the process caches, each social networking application may have its own separate hot caches. In some examples, the hardware that implements the hot caches may be shared among multiple social networking applications, but logically kept specific to each individual application by software. In other examples, the hardware that implements the different hot caches may be separate for each application. In some examples, the hot caches utilize memcached, a general-purpose distributed memory caching system originally developed by Danga Interactive. In some other examples, the hot caches may be implemented on one or more of the social networking application services 1090, data center 2060, or persistent storage 2090 and manager 2080, or a separate data center.

While process caches 1120 and hot caches 2070 were described as specific to a social networking application in that each social networking application can only access data stored by itself, in some examples, process cache 1120, warm cache 2070 or both can be shared caches. In these examples, data submitted to the caches is accessible by all other social networking applications in the same geographical region, or in some other examples, by all social networking applications in general.

On a miss from the hot caches 2050, social networking application service 1090 and social networking application 1070 also have access to a data center 2060 with a series of warm caches 2070. Warm caches, in some examples, are not specific to any particular social networking application service 1090 or any specific social networking application 1070. Instead, data stored in warm caches in some examples may be accessed by any other application executing in the geographical region. In still other examples, any application executing anywhere can access the data stored in the warm caches 2070. In this way, disparate social networking applications within a particular geographic area may decrease access times by sharing data. For example, if the application is MAFIA WARS® from ZYNGA®, it may utilize information regarding user 1080 that was previously collected by a CITYVILLE® application developed by ZYNGA®. In other examples, the warm caches may be application-specific. In some examples, the warm caches are in a separate data center 2060, but in other examples, the warm cache may be implemented as part of one of the social networking application services 1090 or on each social networking application service 1090. The data center can be any combination of hardware and software necessary to implement the warm cache and can include computing resources such as computer processors; temporary and permanent storage such as RAM, ROM, Networked Attached Storage, Storage Area Networks, hard-disks, tape drives, and any means of temporary or permanent storage; network communications for communicating with social networking application service 1090, persistent storage manager 2080, hot caches 2050, or any other component, and the like. Data center 2060 may also include any of the components described in the example machine implementation of this disclosure. In still other examples, warm caches 2070 can be implemented in one or more social networking application services 1090 or implemented with hot caches 2050, or with persistent storage 2090 and manager 2080.

On a miss from the warm cache, social networking application services 1090 and social networking application 1070 have access to a persistent storage manager 2080 and associated persistent storage 2090. In some examples, persistent storage 2090 may persistently store previously requested information from social networking applications 1070. In some examples, once user 1080 is known to the system 2000, the persistent storage manager may begin to store information regarding the user 1080, and in yet other examples, persistent storage manager may actively contact social networking applications 1010-1030 and retrieve additional information for storage. Persistent storage may be any method of storing data for more than a transitory period. In some examples, persistent storage may be implemented as a database or a data store.

In some examples, persistent storage manager may schedule updates of the information about a user based on a variety of events, including the time since the last update, user events such as a user playing a game, or the like. Once the information is updated, persistent storage manager 2080 may be responsible for updating the warm caches 2070 in the various regions 2010-2040 to reflect this new information. Additionally, persistent storage manager 2080 may be responsible for updating warm caches 2070 in the various regions 2010-2040 upon a cache miss for requested data. Persistent storage manager 2080 can be any module that maintains persistent storage 2090, responds to requests for data, and updates user data. Persistent storage manager 2080 may be any combination of hardware and software necessary to manage persistent storage 209 and can include computing resources such as computer processors; temporary and permanent storage such as RAM, ROM, Networked Attached Storage, Storage Area Networks, hard-disks, tape drives, and any means of temporary or permanent storage; network communications for communicating with other components, and the like. Persistent storage manager 2080 may also include any of the components described in the example machine implementation of this disclosure. In addition persistent storage manager 2080 may be integrated with persistent storage 2090.

Once the requested data is obtained from one of the various levels of caches, any cache which "missed" for the data is updated to include the requested data. Persistent storage 2090 is also updated if it misses. In some examples, the warm caches are updated by the persistent storage manager 2080 and the process and hot caches are updated by the social networking application service 1090 or in some examples social networking application 1070.

In some examples, the geographical region 2010 can be divided into sub-geographical regions, each with one or more social networking application services 1090, such that users 1080 that utilize social networking applications 1070 are geographically close to social networking service 1090 such that access times are quicker. In some examples, each sub-geographic region may have its own hot caches 2050, in other examples, hot caches 2050 may serve more than one sub-geographic region, and in yet other examples, the hot caches 2050 may serve all the sub-geographic regions. In some examples data center 2060 is specific to each geographical region 2010. In yet other examples, data center 2060 may be specific to one or more sub-geographical regions.

Thus in some examples, each level of cache may serve a broader geographical, or sub-geographical region. In one example, the process cache 1090 serves a sub-geographical region, the hot caches serve multiple sub-geographical regions, the warm caches serve all sub-geographical regions, whereas the persistent storage 2090 and manager 2080 serve all geographical regions. A geographical region can be any physical grouping of resources and modules. In some examples, the region can be based upon pre-existing territorial or other boundaries, but in other examples the region can be based upon factors such as server access times, network infrastructures, cost, and the like.

Figure 3:
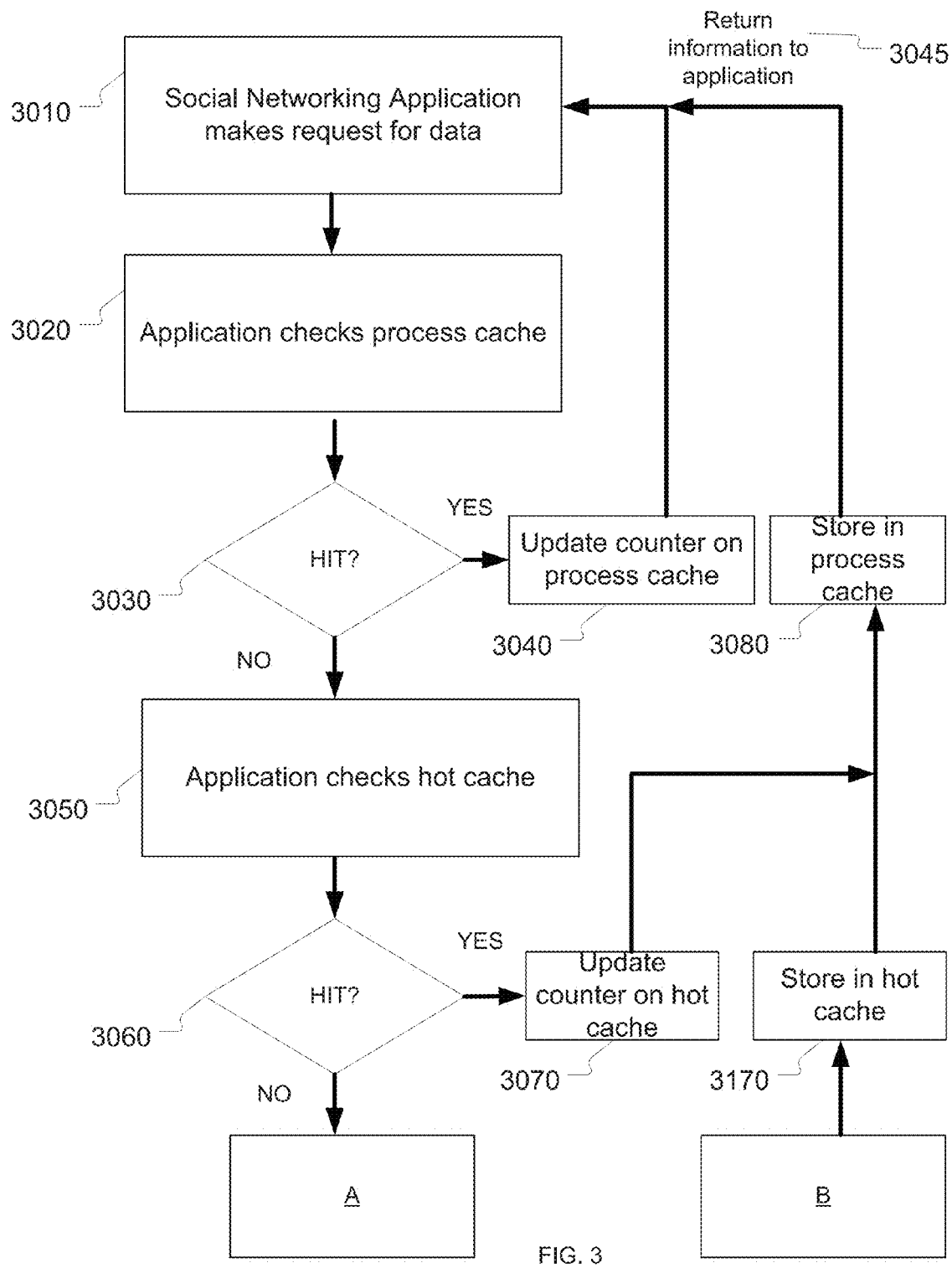
FIG. 3 shows a flow-chart of a caching method according to one example of the present disclosure.

FIG. 3 shows an example method according to the present disclosure. At 3010 the social networking application makes a request for data. First the social networking application service 1090 checks the process cache at 3020. If the cache hits at 3030, then information is refreshed in the process cache at 3040 and returned to the requestor at 3045. In some examples, the various caches may periodically remove stale information that has not been recently accessed in order to keep only the most sought after information. Information that has not been recently accessed may be overwritten by newly accessed information. Refreshing the information indicates that the information was recently accessed and likely should not be overwritten or removed.

If the process cache misses, the application service next checks the hot cache 3050. If the hot cache hits at 3060, the information in the hot cache is returned to the requestor and refreshed 3070, and the information is then stored in the process cache at 3080.

Figure 4:
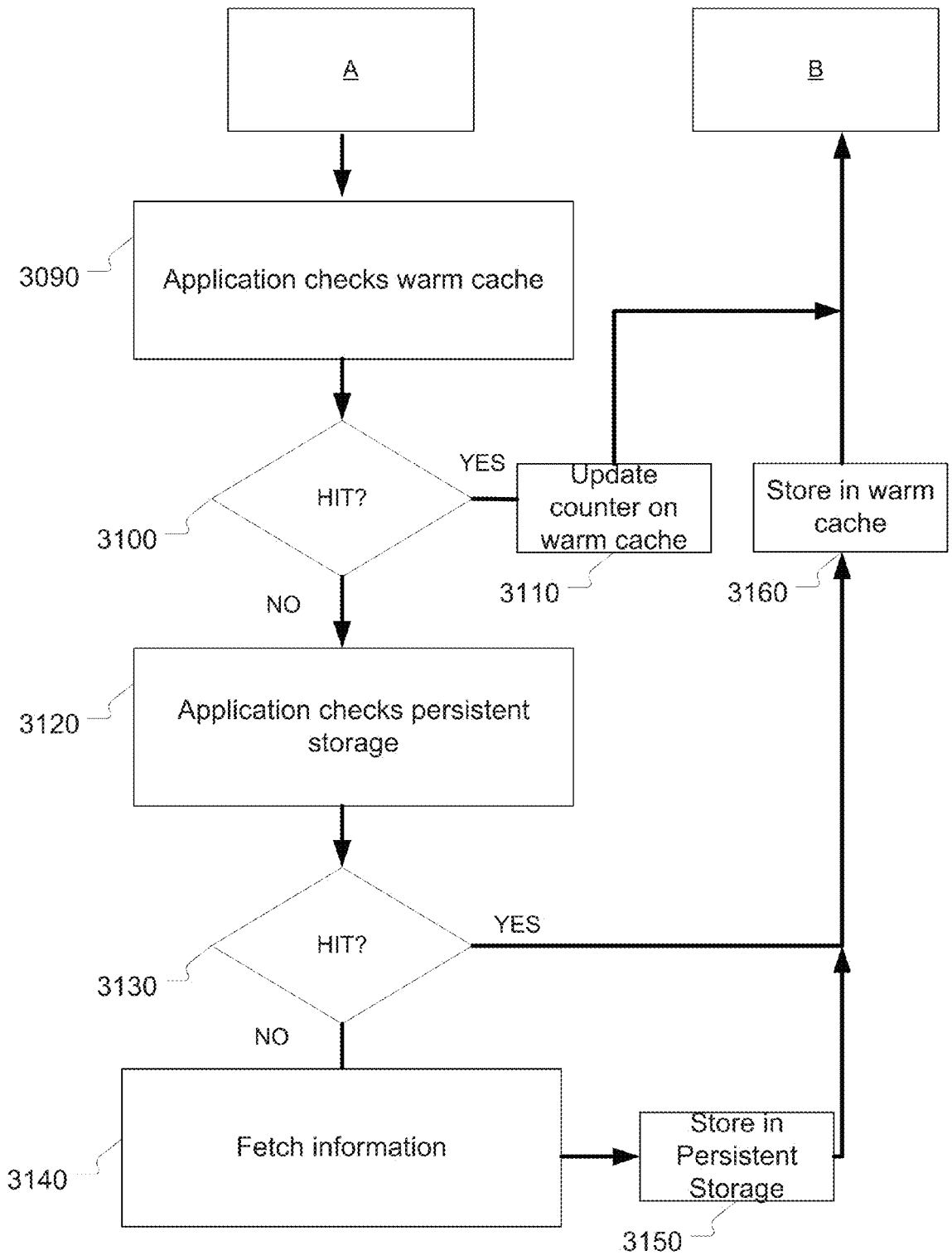
FIG. 4 shows a flow-chart of a caching method according to one example of the present disclosure.

If the hot cache misses, turning to FIG. 4, the application service checks the warm cache 3090. If the warm cache hits at 3100, then the information is returned to the requestor and the warm cache is updated at 3110. Additionally the information is then stored in the hot cache at 3170, and the process cache at 3080.

If the warm cache misses, the application service 1090 then checks persistent storage 3120. If the information is in persistent storage at 3130, then the information is stored in the warm cache 3160, the hot cache 3170 and the process cache at 3080 and returned to the requestor.

If the requested data is not in the persistent storage, then the social networking application service 1090, the social networking application 1070 or the persistent storage manager 2080 may fetch the information from social networking services 1010-1030. Once the information is retrieved it is stored in persistent storage 3150, the warm cache 3160, the hot cache 3170, and the process cache 3080. This operation can be done immediately, or queued for later processing.

In some examples the social networking application 1070 or application service 1090 may be responsible for checking the various caches by first checking process caches 1120, then contacting hot caches 2050, then warm caches 2060 and then persistent storage 2090 and manager 2080. In other examples upon a miss from one of the caches 1120, 2050, 2070, each cache contacts the next cache, thus for example, the hot cache would contact the warm caches upon a miss in the hot caches. The resulting requested application data can be transferred directly back to the social networking application 1070 or application service 1090, or transferred back to the requester (e.g. one of the caches).

While the various components of FIG. 2 are shown connected to each other directly, in some examples, they may be connected through a network. In some examples the network may be the internet, a LAN, WAN, Cellular, or any other network which allows the various components to communicate with each other. The communications over the network may be any method that allows the transfer of the information from the various components. Additionally, while the present disclosure used social networking applications and social networking data, one skilled in the art with the benefit of the present disclosure will appreciate that the caching system disclosed is applicable to other types of applications and other types of data. Additionally, while three levels of caching are shown, one skilled in the art with the benefit of the present disclosure will appreciate that more or fewer caches can be used.

Additional Notes and Examples

Disclosed in one example is a method whereby a request for application data may be made by a first application over a network. The method may include searching for the application data in a first cache using at least one computer processor, responsive to a miss from the first cache, contacting over the network a second cache and searching for the application data in the second cache, responsive to a miss from the second cache, contacting over the network a third cache and searching for the application data in the third cache. The third cache may be specific to one of a plurality of geographical areas, the third cache storing data for the first application and a plurality of other applications executing in that geographical area, the searching for the application data in the third cache including searching data stored by the plurality of other applications and data stored by the first application. The method may also include, responsive to a miss from the third cache, contacting over the network a persistent store and searching for the application data in the persistent store and responsive to a hit from any of the first, second, or third caches, receiving the application data.

Disclosed in another example is a caching system. The caching system may have a first cache specific to a first application and configured to store data and search for application data requested over a network from the first application and responsive to a hit in the first cache, to return the application data to the first application. The caching system also may have a second cache communicatively coupled to the first cache through the network, the second cache configured to store data, search for the application data in response to a miss from the first cache, and return the application data to the first application in response to a hit in the second cache. The caching system may also have a third cache communicatively coupled to the first and second caches through the network, the third cache specific to one of a plurality of geographical areas and configured to store data for the first application and a plurality of other applications executing in that geographical area, search for the application data in the data stored by the plurality of other applications and data stored by the first application in response to a miss from the second cache, and return the application data to the first application in response to a hit in the third cache. The caching system may also have a persistent store configured to store data, responsive to a miss from the third cache, search for the application data, and responsive to a hit from the persistent store, return the application data to the first application.

Disclosed in another example is a machine readable storage medium that stores instructions which when performed by a machine, causes the machine to perform certain operations. The operations include receiving a request for application data made by a first application over a network. The operations may include searching for the application data in a first cache, responsive to a miss from the first cache, contacting over the network a second cache and searching for the application data in the second cache, responsive to a miss from the second cache, contacting over the network a third cache and searching for the application data in the third cache. The third cache may be specific to one of a plurality of geographical areas, the third cache storing data for the first application and a plurality of other applications executing in that geographical area, the searching for the application data in the third cache including searching data stored by the plurality of other applications and data stored by the first application. The operations may also include, responsive to a miss from the third cache, contacting over the network a persistent store and searching for the application data in the persistent store and responsive to a hit from any of the first, second, or third caches, receiving the application data.

These examples maybe combined in any permutation or combination. These non-limiting additional notes and examples are intended to provide an overview of subject matter of the present patent application. It is not intended to provide an exclusive or exhaustive explanation of the invention. The detailed description is included to provide further information about the present patent application.

Modules, Components, and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Implementation

Figure 5:
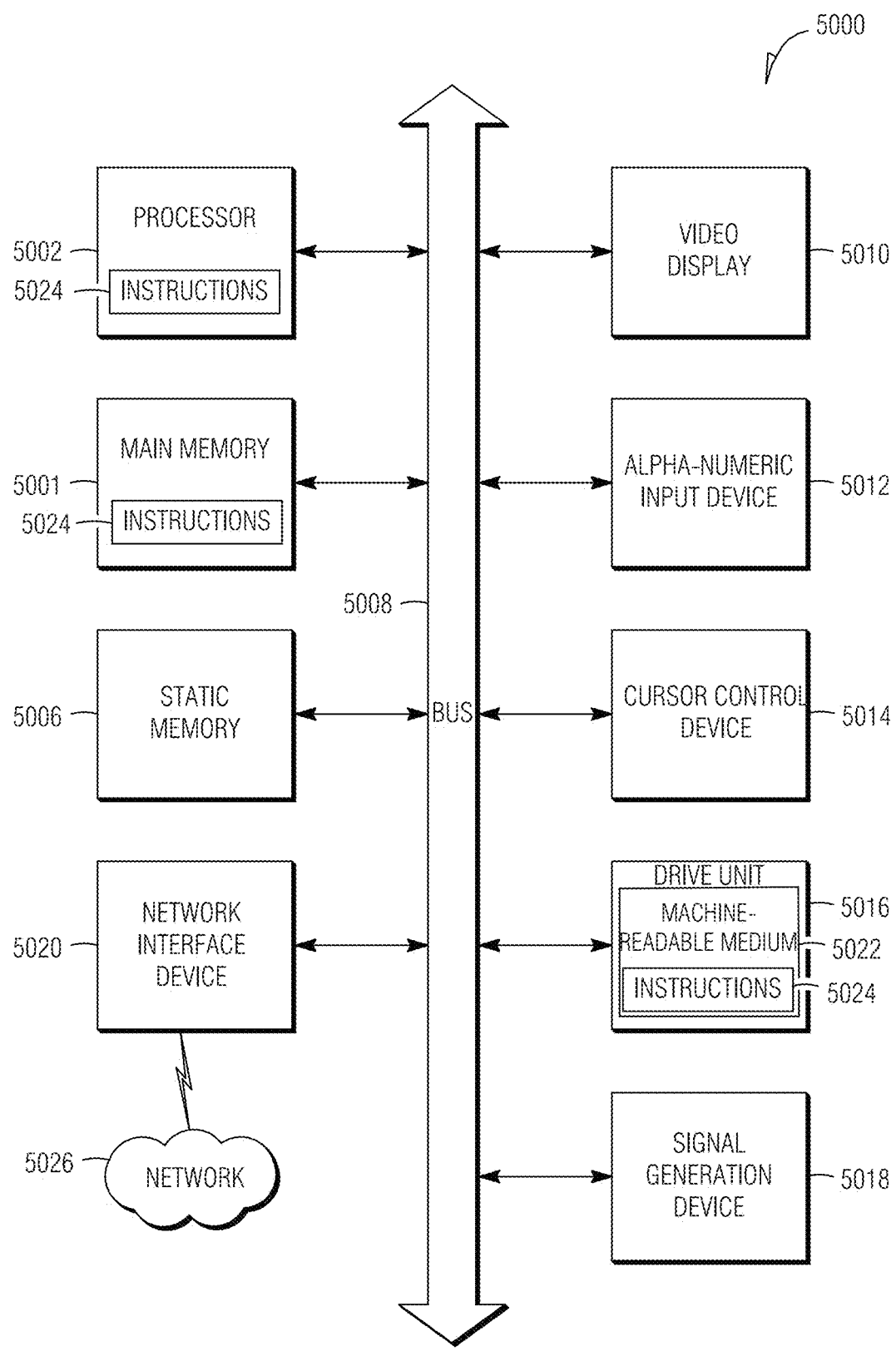
FIG. 5 shows an example schematic of a machine according to one example of the present disclosure.

FIG. 5 shows a diagrammatic representation of a machine in the example form of a computer system 5000 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments may also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 5000 includes a processor 5002 (e.g., a Central Processing Unit (CPU), a Graphics Processing Unit (GPU) or both), a main memory 5001 and a static memory 5006, which communicate with each other via a bus 5008. The computer system 5000 may further include a video display unit 5010 (e.g., a Liquid Crystal Display (LCD) or a Cathode Ray Tube (CRT)). The computer system 5000 also includes an alphanumeric input device 5012 (e.g., a keyboard), a User Interface (UI) cursor controller 5014 (e.g., a mouse), a disk drive unit 5016, a signal generation device 5018 (e.g., a speaker) and a network interface device 5020 (e.g., a transmitter).

The disk drive unit 5016 includes a machine-readable medium 5022 on which is stored one or more sets of instructions 5024 and data structures (e.g., software) embodying or used by any one or more of the methodologies or functions illustrated herein. The software may also reside, completely or at least partially, within the main memory 5001 and/or within the processor 5002 during execution thereof by the computer system 5000, the main memory 5001 and the processor 5002 also constituting machine-readable media.

The instructions 5024 may further be transmitted or received over a network 5026 via the network interface device 5020 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

Additional Notes

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description.

The Abstract is provided to comply with 37 C.F.R. §1.72 (b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

Thus, the following claims are hereby incorporated into the Detailed Description, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A method of caching application data, the method comprising:
   receiving over a network at a first cache a request from a first social networking application for a particular piece of social networking data, the first cache being accessible only by the first social networking application;
   searching for the particular piece of social networking data in the first cache using at least one computer processor; and
   handling a miss for the particular piece of social networking data in the first cache, including:
      searching for the particular piece of social networking data in a second cache, the second cache being accessible over the network and storing data from a plurality of social networking applications including the first social networking application and a second social networking application; and
      sending the particular piece of social networking data over the network to the first social networking application in response to a hit for the particular piece of social networking data in the second cache, wherein the particular piece of social networking data was placed in the second cache by the second social networking application.

2. The method of claim 1, wherein the plurality of social networking applications are games.

3. The method of claim 1, wherein the plurality of social networking applications are executed on a plurality of computing devices located in a common geographical area.

4. The method of claim 1, wherein handling a miss for the particular piece of social networking data in the first cache includes refreshing the first cache responsive to a hit for the particular piece of social networking data in the second cache.

5. The method of claim 1, wherein handling a miss for the particular piece of social networking data in the first cache includes searching a third cache for the particular piece of social networking data in response to a miss for the particular piece of social networking data in the second cache, the third cache being accessible by a second plurality of social networking applications, the second plurality of social networking applications being a superset of the plurality of social networking applications.

6. The method of claim 1, wherein handling a miss for the particular piece of social networking data in the first cache includes the first social networking application contacting the second cache in response to the miss in the first cache to initiate the search for the particular piece of social networking data in the second cache.

7. The method of claim 1, comprising the first cache contacting the second cache responsive to the miss in the first cache to initiate the search for the particular piece of social networking data in the second cache.

8. A caching system comprising:
   a first cache subsystem maintaining a first cache, configured to:
      receive a request from a first social networking application for a particular piece of social networking data, the first cache being accessible only by the first social networking application;
      search for the particular piece of social networking data in the first cache using at least one computer processor;
   a second cache subsystem maintaining a second cache, configured to:
      receive a second request for the particular piece of social networking data, the second request being provided in response to a miss for the particular application data in the first cache;
      search for the particular piece of social networking data in the second cache, the second cache being accessible by, and storing data from, a plurality of social networking applications including the first social networking application and a second social networking application; and a data retrieval component configured to:
provide the particular piece of social networking data to the first application responsive to a hit for the particular piece of social networking data in the second cache, wherein the particular piece of social networking data was placed in the second cache by the second application.

9. The system of claim 8, wherein the plurality of social networking applications are games.

10. The system of claim 8, wherein the plurality of social networking applications are executed on computing devices located in a common geographical area.

11. The system of claim 8, wherein the first cache is configured to be refreshed responsive to a hit for the particular piece of social networking data in the second cache.

12. The system of claim 8, comprising a third cache, the third cache configured to search for the particular piece of social networking data responsive to a miss from the second cache, the third cache being accessible by, and storing data from, a second plurality of social networking applications, the second plurality of social networking applications being a superset of the first plurality of social networking applications.

13. The system of claim 8, wherein the first social networking application is configured to communicate with the second cache subsystem responsive to the miss in the first cache to initiate the search for the particular piece of social networking data in the second cache.

14. The system of claim 8, wherein the first cache subsystem is configured to communicate with the second cache subsystem responsive to the miss in the first cache to initiate the search for the particular piece of social networking data in the second cache.

15. A non-transitory machine readable storage medium, the machine readable storage medium comprising instructions which when performed by a machine, cause the machine to perform the operations of:

providing a user interface for a first social networking application;

contacting, over a network, a first cache to be searched for a particular piece of social networking data, the first cache being accessible only by the first social networking application;

responsive to a miss for the particular application data in the first cache, causing a search of a second cache, the second cache accessible over the network, the second cache accessible by, and storing data from, a plurality of social networking applications including the first social networking application and a second social networking application;

responsive to a hit for the particular piece of social networking data in the second cache, receiving the particular piece of social networking data from the second cache over the network, wherein the particular piece of social networking data was placed in the second cache by the second application; and displaying the particular piece of social networking data in the user interface of the social networking application.

16. The non-transitory machine-readable storage medium of claim 15, wherein the first social networking application is a game.

17. The non-transitory machine-readable storage medium of claim 15, wherein the first and second social networking applications are executed on computing devices located in a common geographical area.

18. The non-transitory machine-readable storage medium of claim 15, wherein the instructions include instructions, which when performed by the machine, cause the machine to refresh the first cache responsive to a hit for the particular piece of social networking data in the second cache.

19. The non-transitory machine-readable storage medium of claim 15, wherein the instructions include instructions, which when performed by the machine, cause the machine to search a third cache responsive to a miss from the second cache, the third cache being accessible by a second plurality of social networking applications, the second plurality of social networking applications being a superset of the first plurality of social networking applications.

* * * * *